United States Patent

Pausch et al.

Patent Number: 5,414,564
Date of Patent: May 9, 1995

[54] DEFORMABLE TELESCOPE MIRROR

[75] Inventors: Konrad Pausch, Essen-Bredeney; Karl-Heinz Stenvers, Issum, both of Germany

[73] Assignee: Krupp Industrietechnik Gesellschaft mit beschränkter Haftung, Duisburg, Germany

[21] Appl. No.: 31,133

[22] Filed: Mar. 12, 1993

[30] Foreign Application Priority Data

Mar. 14, 1992 [DE] Germany ............... 42 08 229.3

[51] Int. Cl.$^6$ ............... G02B 5/08; G02B 7/18
[52] U.S. Cl. ............... 359/846; 359/849
[58] Field of Search ............... 359/846, 847, 848, 849, 359/871, 872, 224, 225

[56] References Cited

U.S. PATENT DOCUMENTS

| 4,226,507 | 10/1980 | Fuschetto | 359/849 |
|---|---|---|---|
| 4,295,710 | 10/1981 | Heinz | 359/849 |
| 4,408,832 | 10/1983 | Hartman et al. | |
| 4,655,563 | 4/1987 | Plante et al. | |
| 4,657,358 | 4/1987 | Anthony et al. | 359/849 |
| 4,725,144 | 2/1988 | Nelson et al. | 359/846 |
| 4,875,765 | 10/1989 | Vandenberg et al. | 359/849 |
| 4,906,087 | 3/1990 | Ealey et al. | 359/849 |
| 4,934,803 | 6/1990 | Ealey | 359/849 |
| 4,959,531 | 9/1990 | Marino | 359/849 |
| 5,035,497 | 7/1991 | Itoh | 359/849 |
| 5,037,184 | 8/1991 | Ealey | 359/849 |

FOREIGN PATENT DOCUMENTS

| 2414266 | 10/1975 | Germany. | |
|---|---|---|---|
| 3502025 | 7/1986 | Germany. | |
| 247089 | 6/1987 | Germany. | |
| 3642128 | 6/1988 | Germany. | |
| 1268048 | 3/1972 | United Kingdom | 359/848 |

OTHER PUBLICATIONS

Albertinetti et al; "Deformable Mirrors with Bimorph Actuators"; SPIE vol. 179 Adaptive Optical Components II; 1979; pp. 28–31.
Morrison; "Development Problems of the Primary Mirror for Large Space Telescopes"; S.P.I.E. Journal; vol. 8; May 1970; pp. 107–118.
Wilson et al, "Active Optics", Journal of Modern Optics, 1987, vol. 34, No. 4, pp. 485–509.
Technische Mitteilung Krupp (Krupp Technical Bulletin), vol. 1, May 1990, pp. 27–42.

Primary Examiner—Ricky D. Shafer
Attorney, Agent, or Firm—Spencer, Frank & Schneider

[57] ABSTRACT

A telescope mirror assembly includes a space frame; a deformable mirror body; a plurality of spaced supporting elements bonded to the mirror body by an adhesive; a fastening assembly for releasably securing each supporting element to the space frame for combining the mirror body and the space frame into a self-supporting construction; piezoelements interposed between each supporting element and the space frame for selectively imparting by the piezoelements a pressing or pulling force to a portion of the mirror body for moving such portion toward or away from the space frame.

11 Claims, 3 Drawing Sheets

DEFORMABLE TELESCOPE MIRROR

CROSS REFERENCE TO RELATED APPLICATION

This application claims the priority of German Application No. P 42 08 229.3, filed Mar. 14, 1992, which is incorporated herein by reference.

BACKGROUND OF THE INVENTION

This invention relates to a telescope mirror assembly which has a deformable glass-ceramic mirror body, support elements engaging the mirror body and setting drives which are mounted on a supporting space frame and by means of which the supporting elements are adjustable in their position relative the space frame to thus displace defined areas of the mirror body.

One of the greatest challenges of modern astronomy is the detection of celestial bodies of extremely weak light, which are situated at a distance of many billions of light years from earth. To make possible such a detection, an enlargement of the light-gathering surface of the telescope mirrors is required while the surface accuracies are preserved or even augmented in the nanometer range.

In the periodical "Journal of Modern Optics" 1987, Volume 34, No. 4, on pages 485-509 the proposal has been submitted to so design a telescope mirror that it is deformable by means of drive mechanisms mounted on a supporting structure for improving the optical quality and economy of large telescopes. According to the proposal the mirror body merely lies, by virtue of its large own weight, on the respective supporting elements so that a deformation in the direction of the supporting structure is effected exclusively by gravity, taken up by an expensive setting mechanism.

In the "Technische Mitteilung Krupp" ("Krupp Technical Bulletin"), Volume 1 of 1990, pages 27-42, a telescope is described which has a mirror body supported by a space frame formed of node elements of Invar steel interconnected by space frame struts. The struts include pipes made of carbon fiber reinforced plastic on which coupling cones also made of Invar steel (Ni 36) are secured by an adhesive.

An optical surface adapted for a telescope is obtained if the root mean square (rms) of the surface errors does not exceed a value in the magnitude of $rms = \lambda/28$ wherein $\lambda$ is the wavelength of light. In case of visible light, care has to be taken that the mirror surface has, under all operating conditions, an rms value of less than 18 nanometer.

SUMMARY OF THE INVENTION

It is an object of the invention to provide an improved deformable telescope mirror whose applicability is enhanced by a reduction of weight while maintaining a high degree of stiffness and by lowering manufacturing costs. It is a further object to eliminate or at least reduce thermally caused air circulations by virtue of a particularly low thermal inertia.

These objects and others to become apparent as the specification progresses, are accomplished by the invention, according to which, briefly stated, the telescope mirror assembly includes a space frame; a deformable mirror body; a plurality of spaced supporting elements bonded to the mirror body by an adhesive; a fastening assembly for releasably securing each supporting element to the space frame for combining the mirror body and the space frame into a self-supporting construction; piezoelements interposed between each supporting element and the space frame for selectively imparting by the piezoelements a pressing or pulling force to a portion of the mirror body for moving such portion toward or away from the space frame.

Thus, the invention resides in the provision of a self-supporting carrier unit ("hybrid mirror") which is formed of a combination of a thin mirror body with a space frame. The mirror body and the space frame are releasably connected to one another by means of support elements glued to the mirror body and piezoelements cooperating with the supporting elements. In contrast to prior art constructions, according to the invention the mirror body and the space frame are connected with one another in such a manner that the mirror body may be selectively exposed to pressing and pulling forces by the piezoelements.

The advantage achieved by the use of an adhesive bond resides in the fact that the adhesive may be applied in a simple manner and after positioning the mirror body on the supporting elements and after the hardening of the adhesive a very accurate and stress-free connection is achieved.

By means of the economical and operationally safe piezoelements, the shape of the mirror body may be—in contrast to prior art constructions—set or corrected in a path-controlled manner. In the simplest embodiment, the piezoelements are merely formed by an appropriately dimensioned piezoceramic body. It is of advantage that in taking into consideration the combination of space frame and mirror body, the mirror body and thus also the stiffened carrier unit have a significantly reduced total weight which makes the construction adapted for use in space.

It is noted that the invention is not limited to constructions which have but a single mirror body: rather, a plurality of carrier units may be combined into a segmented telescope mirror.

In order to ensure that the bending moments (torques) generated by the changing of the shape of the mirror are reduced to the greatest extent possible, according to a further feature of the invention, the supporting elements have, in the direction of the associated piezoelement, at least one constriction (cross-sectional reduction) functioning as a neck.

According to a further feature of the invention, a second adhesive bond is provided as viewed from the mirror body in the direction of the respective, associated piezoelement. The supporting elements are in engagement with their respective piezoelement with the intermediary of an adhesive area. By means of the adhesive areas during assembly angular and distance errors between the mirror body and the space frame may be simultaneously compensated for, so that an otherwise required finishing accuracy may be dispensed with. The second adhesive connection may be designed in particular such that the support elements are connected at least indirectly with their respective piezoelement by means of a dished, socket-like receiving surface.

According to another advantageous feature of the invention, the supporting elements are held in place at the driving side of the piezoelement by means of an extension piece (intermediate member). A faultless functioning of the piezoelements under all operating conditions may be ensured according to still another advantageous feature of the invention which provides that the piezoelements are—at least indirectly—exposed to a biasing force directed away from the mirror body.

Expediently, the piezoelements are arranged in the node elements of that face of the space frame which is oriented towards the mirror body.

According to a preferred embodiment of the invention, each earlier-noted extension piece is releasably held by a respective tensioning screw against the associated piezoelement and the tensioning screw is urged into engagement against the frontal node element by means of an adjustable compression spring. This arrangement has the advantage that the respective piezoelement is exposed to the biasing force generated by the compression spring with the intermediary of the extension piece and in this manner is fixedly held on a frontal node element of the space frame. By releasing the tensioning screws, the mirror body may be removed from the space frame together with the structural elements (supporting elements and extension pieces) secured to the mirror body. By providing the above-outlined biasing (pretensioning) assembly, subsequent finishing processes and a precise reassembly of the carrier unit may be possible without complex adjusting steps.

To ensure that the carrier unit has, despite a possibly low total weight, a sufficient stiffness and lack of sensitivity concerning changing operational conditions (particularly thermal and/or climatic changes), the node elements of the space frame are made of Invar steel. The space frame struts connecting the node elements with one another are pipes made of carbon fiber-reinforced plastic having at their ends adhesively bonded coupling cones, also made of Invar steel.

To achieve a particularly advantageous homogeneous structural behavior, according to a preferred embodiment of the invention, the space frame has a tetrahedral construction. The uniformity of all space frame struts and node elements achieved in this manner lead to a significant saving of manufacturing costs.

The carrier unit designed as a "hybrid mirror" may be secured to a carrier frame with the intermediary of the space frame in a conventional manner. By means of the carrier frame the hybrid mirror may be oriented towards the celestial object to be observed. The construction of the carrier frame, however, does not form part of this invention.

DESCRIPTION OF THE PREFERRED EMBODIMENT

Figure 1:
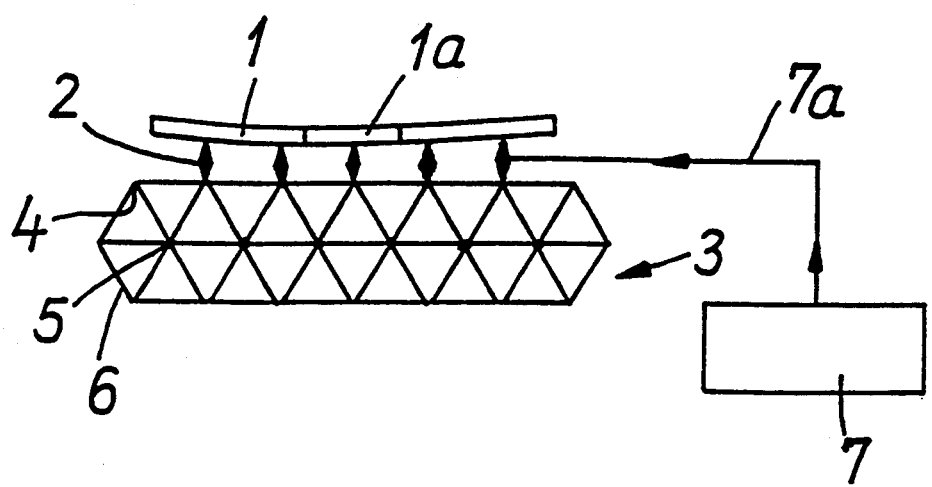
FIG. 1 is a highly schematic side elevational view of a hybrid mirror assembly according to the invention, having a mirror body secured by setting elements to a space frame.

Turning to FIG. 1, the mirror assembly according to the invention shown therein includes a thin glass-ceramic mirror body 1 having a central opening 1a, driven support elements 2 which are height-adjustable in either direction and a space frame 3 formed of externally situated node elements 4, internally situated node elements 5 and struts 6 which interconnect the node elements with one another.

The mirror body 1 and the space frame 3 are connected to one another by the support elements 2 in such a manner that the mirror body 1 and the space frame 3 together form a self-supporting assembly which has a sufficient stiffness and, at the same time, a low total weight. The components 4, 5 and 6 of the space frame 3 are structured such that the space frame, besides a sufficient stiffness, has a coefficient of heat expansion which in order of magnitude very closely approximates that of the mirror body 1.

Figure 2:
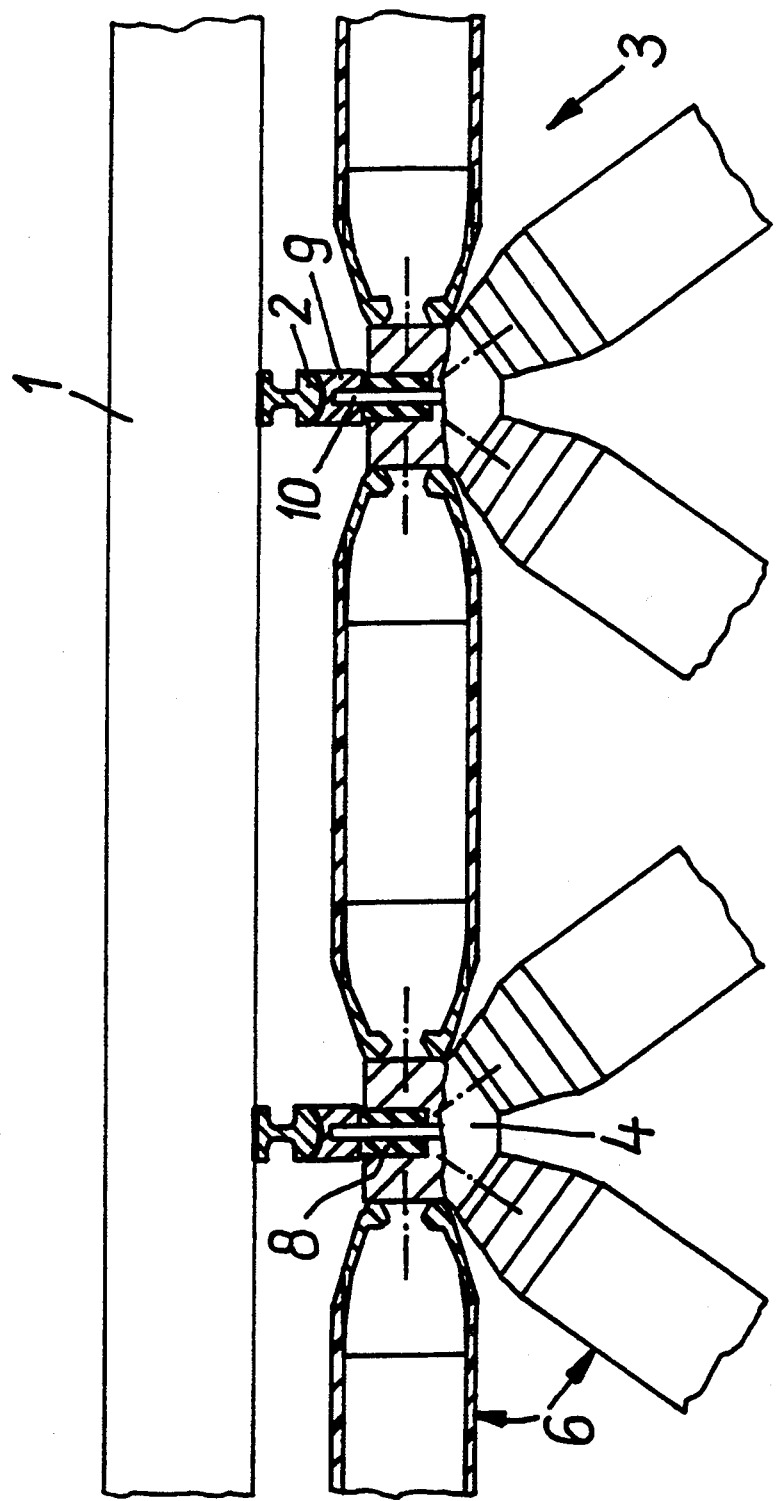
FIG. 2 is a schematic sectional side elevational view, on an enlarged scale, of one part of the construction shown in FIG. 1 wherein the mirror assembly is shown in the zone of two adjoining node elements of the supporting space frame.
Figure 3:
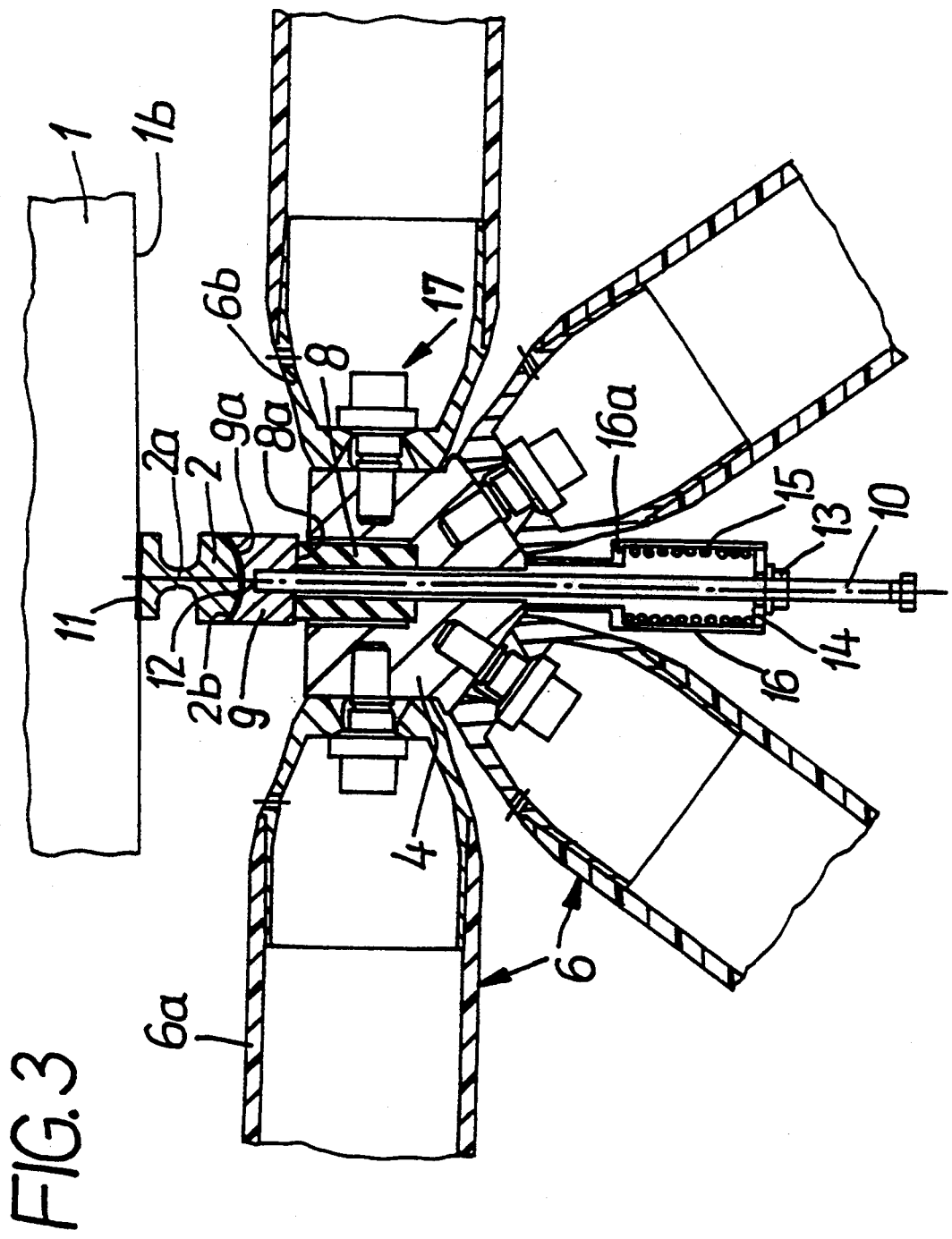
FIG. 3 is a schematic sectional side elevational view on an enlarged scale of one part of the construction shown in FIG. 2.

Turning to FIGS. 2 and 3, in blind bores of the outer node elements 4 piezoceramic piezoelements 8 of simple, sleeve-like construction are arranged. Their upwardly oriented driving side 8a holds the supporting elements 2 by means of extension pieces (also referred to as intermediate members) 9 by virtue of respective fastening means including tensioning screws 10 threadedly engaged by the intermediate members 9 and passing axially through the piezoelements 8 with an annular clearance. The screws 10 engage the outer node elements 4 from the outside.

The adjustment of the shape (deformation) of the mirror body 1 to compensate for manufacturing inaccuracies and/or for adapting it to changing operational conditions is effected by a schematically shown regulating unit 7 which effects the height adjustment of the supporting elements 2 either in a direction towards the mirror body 1 (that is, upwardly) or in the direction of the space frame 3 (that is, downwardly). Thus, by applying an electric field to selected piezoelements 8 in a conventional manner by the regulating unit 7 via conductor 7a, a proportionate elastic expansion or compression is achieved with the result that the parts 2 and 9 move towards or away from the respective node element 4 and thus correspondingly move the deformable mirror body 1 in its respective zone.

The support elements 2 which are secured to the underside 1b of the mirror body 1 by means of an adhesive area 11 have, in the zone between the mirror body 1 and the intermediate piece 9, at a distance from either end of the support element, a constriction 2a which functions as a relatively resilient neck. By means of the constriction 2a bending torques appearing between the mirror body 1 and the respective node element 4 may be reduced to a significant degree. Each support element 2 engages by means of a convex portion 2b a dished, socket-like supporting surface 9a of the intermediate member 9. At that location the components 2 and 9 are permanently affixed to one another by means of a second adhesive area 12.

The use of adhesive connections between the mirror body and the supporting elements and between the supporting elements and the intermediate pieces makes possible during the assembling of the hybrid mirror accurate and stress-free connections while requirements concerning manufacturing accuracy may be lowered.

Each intermediate member 9 is axially tightened to a respective piezoelement 8 by a tensioning bolt 10 which projects beyond the respective node element 4 on its side oriented away from the mirror body 1. Below the node element 4, the tensioning bolt 10 engages, by means of a setting nut 13 and a tensioning plate 14, a biased compression spring 15 which is positioned on a spring support 16a within a housing 16. The housing 16 in which the tensioning plate 14 may move in the longitudinal housing direction, is secured to the underside of the respective node element 4. By virtue of the action of the compression spring 15 and the tensioning bolt 10, the supporting element 2 is elastically held in position by means of the intermediate member 9 on the piezoelement 8 so that the piezoelement 8 too, is exposed to a defined biasing force. Thus, under all operational conditions a highly satisfactory engagement of the intermediate member 9 on the driving side 8a of the piezoelement 8 is ensured.

The structure described above further makes possible to disassemble and reassemble the mirror body 1 in a simple manner by releasing or tightening the tension bolt 10 and thus no complex adjustment work is needed.

The frame struts 6 are formed of pipes 6a made of a carbon reinforced synthetic material and coupling cones 6b adhesively bonded to the pipe ends. The coupling cones 6b are, similarly to components 2, 9 and 4, made of an Invar steel (for example, Ni 36). The frame struts 6 are secured to the node elements 4 and 5 by screws 17 engaging the coupling cones 6b.

It is further advantage of the invention that the novel hybrid mirror assembly, due to its low total weight, has a particularly low thermal inertia whereby air circulations caused by thermal effects above the mirror body 1 may be more easily avoided.

It will be understood that the above description of the present invention is susceptible to various modifications, changes and adaptations, and the same are intended to be comprehended within the meaning and range of equivalents of the appended claims.

What is claimed is:

1. A telescope mirror assembly comprising
   (a) a space frame;
   (b) a deformable mirror body;
   (c) a plurality of spaced supporting elements bonded to the mirror body by an adhesive;
   (d) fastening means for releasably securing each said supporting element to said space frame for combining said mirror body and said space frame into a self-supporting construction;
   (e) piezoelements interposed between each said supporting element and said space frame for selectively imparting by the piezoelements a pressing or pulling force to a portion of said mirror body for moving said portion toward or away from said space frame; and
   (f) an intermediate member disposed between each supporting element and a respective said piezoelement; each said intermediate member having opposite first and second ends; said first end engaging an end of a respective said supporting element and said second end engaging an end of said respective piezoelement; said first end being bonded by an adhesive to said end of said respective supporting element.

2. A telescope mirror assembly comprising
   (a) a space frame having a plurality of node elements arranged at a space frame face;
   (b) a deformable mirror body;
   (c) a plurality of spaced supporting elements bonded to the mirror body by an adhesive;
   (d) fastening means for releasably securing each said supporting element to said space frame for combining said mirror body and said space frame into a self-supporting construction; said space frame face being oriented toward said mirror body;
   (e) piezoelements interposed between each said supporting element and said space frame for selectively imparting by the piezoelements a pressing or pulling force to a portion of said mirror body for moving said portion toward or away from said space frame; each said piezoelement being supported on a respective said node element;
   (f) an intermediate member disposed between each supporting element and a respective said piezoelement; each said intermediate member having opposite first and second ends; said first end engaging an end of a respective said supporting element and said second end engaging an end of said respective piezoelement;
   (g) a releasable tensioning bolt securing each intermediate member and the respective piezoelement to a respective said node element; said tensioning bolt forming part of said fastening means; and
   (h) a compression spring engaging each tensioning bolt for urging each tensioning bolt away from said mirror body for pressing the respective intermediate member against the respective piezoelement.

3. The telescope mirror assembly as defined in claim 2, wherein each said tensioning bolt passes through the respective piezoelement and threadedly engages the respective intermediate member.

4. A telescope mirror assembly comprising
   (a) a space frame including
      (1) a plurality of Invar steel node elements arranged at a space frame face;
      (2) a plurality of tubular struts interconnecting said node elements; said tubular struts being of carbon fiber-reinforced plastic; each said tubular strut having opposite ends;
      (3) an Invar steel coupling cone bonded by an adhesive to each end of said struts; and
      (4) means for attaching said coupling cones to respective said node elements;
   (b) a deformable mirror body;
   (c) a plurality of spaced supporting elements bonded to the mirror body by an adhesive;
   (d) fattening means for releasably securing each said supporting element to said space frame for combining said mirror body and said space frame into a self-supporting construction; said space frame face being oriented toward said mirror body; and
   (e) piezoelements interposed between each said supporting element and said space frame for selectively imparting by the piezoelements a pressing or pulling force to a portion of said mirror body for moving said portion toward or away from said space frame; each said piezoelement being supported on a respective said node element.

5. A telescope mirror assembly comprising
   (a) a space frame composed of a plurality of spaced node elements and struts interconnecting said node elements;
   (b) a deformable mirror body;
   (c) a plurality of spaced supporting elements bonded to the mirror body by an adhesive; each said supporting element having opposite ends and a constriction forming a neck portion of said supporting element; said constriction being located at a distance from said opposite ends;
   (d) fastening means for releasably securing each said supporting element to said space frame for combining said mirror body and said space frame into a self-supporting construction; and
   (e) piezoelements interposed between each said supporting element and said space frame for selectively imparting by the piezoelements a pressing or pulling force to a portion of said mirror body for moving said portion toward or away from said space frame.

6. The telescope mirror assembly as defined in claim 5, further comprising force-exerting means for continuously urging each said piezoelement away from said mirror body.

7. A telescope mirror assembly comprising
   (a) a space frame composed of a plurality of spaced node elements and struts interconnecting said node elements;
   (b) a deformable mirror body;
   (c) a plurality of spaced supporting elements bonded to the mirror body by an adhesive;
   (d) fastening means for releasably securing each said supporting element to said space frame for combining said mirror body and said space frame into a self-supporting construction;
   (e) piezoelements interposed between each said supporting element and said space frame for selectively imparting by the piezoelements a pressing or pulling force to a portion of said mirror body for moving said portion toward or away from said space frame; and
   (f) an intermediate member disposed between each supporting element and a respective said piezoelement; each said intermediate member having opposite first and second ends; said first end engaging an end of a respective said supporting element and said second end engaging an end of said respective piezoelement.

8. The telescope mirror assembly as defined in claim 7, wherein said first end is bonded by an adhesive to said end of said respective supporting element.

9. The telescope mirror assembly as defined in claim 7, wherein said end of each said supporting element and said first end have interengaging complemental curved surfaces.

10. The telescope mirror assembly as defined in claim 9, wherein the curved surface of the supporting elements is outwardly concave.

11. A telescope mirror assembly comprising
    (a) a space frame composed of a plurality of spaced node elements and struts interconnecting said node elements;
    (b) a deformable mirror body;
    (c) a plurality of spaced supporting elements bonded to the mirror body by an adhesive;
    (d) fastening means for releasably securing each said supporting element to said space frame for combining said mirror body and said space frame into a self-supporting construction;
    (e) piezoelements interposed between each said supporting element and said space frame for selectively imparting by the piezoelements a pressing or pulling force to a portion of said mirror body for moving said portion toward or away from said space frame; each said piezoelement being supported on a respective said node element;
    (f) an intermediate member disposed between each supporting element and a respective said piezoelement; each said intermediate member having opposite first and second ends; said first end engaging an end of a respective said supporting element and said second end engaging an end of said respective piezoelement;
    (g) a releasable tensioning bolt securing each intermediate member and the respective piezoelement to a respective said node element; said tensioning bolt forming part of said fastening means; and
    (h) a compression spring engaging each tensioning bolt for urging each tensioning bolt away from said mirror body for pressing the respective intermediate member against the respective piezoelement.

* * * * *